J. B. PARISH.
Coffee Pot.
No. 23,603.
Patented April 12, 1859.
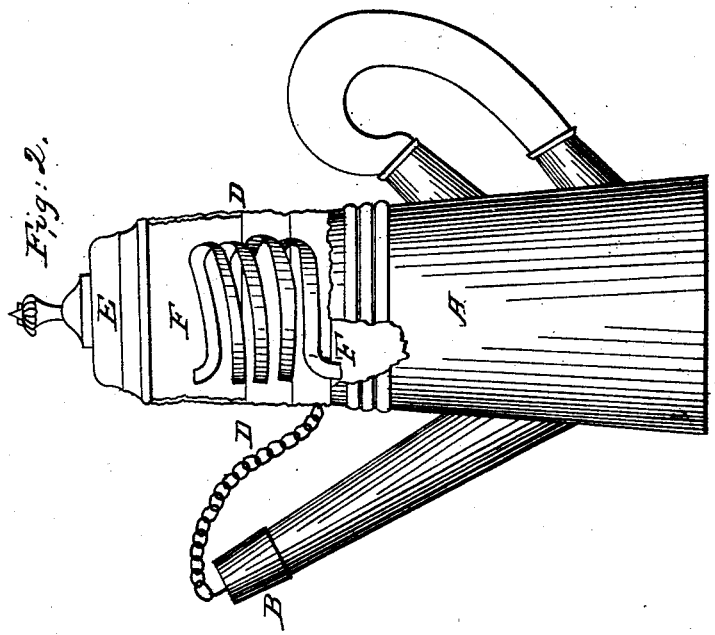
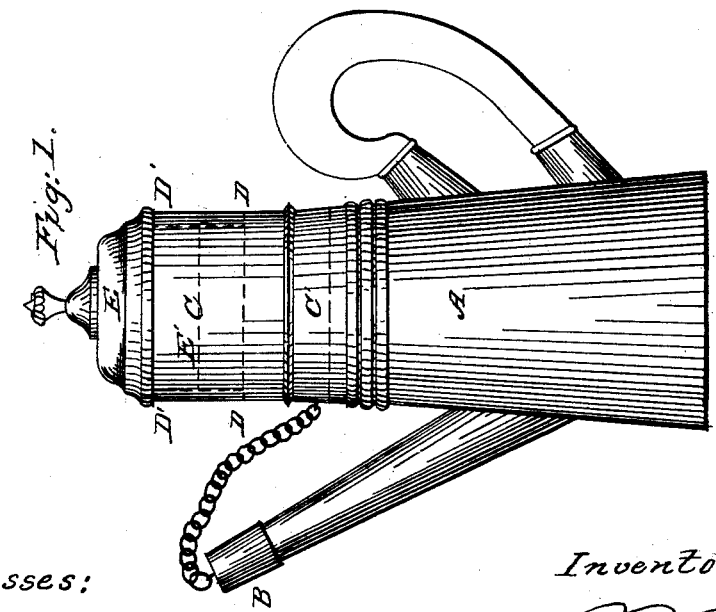
Witnesses:
J Brainerd
W. H. Burning
Inventor:
James B. Parish

UNITED STATES PATENT OFFICE.

JAMES B. PARISH, OF CLEVELAND, OHIO.

COFFEE-POT.

Specification of Letters Patent No. 23,603, dated April 12, 1859.

*To all whom it may concern:*

Be it known that I, JAMES B. PARISH, of Cleveland, in the county of Cuyahoga and State of Ohio, have invented new and useful Improvements in Coffee-Pots; and I do hereby declare that the following is a full and complete description of the construction and operation of the same, reference being had to the accompanying drawings, making part of this specification.

The body of the coffee pot A A Figures 1 and 2, is made after the usual form. A cap B, is placed upon the spout to prevent the escape of vapor. A condensing vessel C, is placed upon the top of the coffee pot, which fits closely inside and extends downward to the dotted line C', in Fig. 1. This condensing cup C, is furnished with a valve cover E, which fits loosely inside of the condensing cup C, and extends downward to the dotted line D D in Fig. 1, and the line D D, in Fig. 2. The lower end of this cover valve E, being a couple of inches or more below the top of the condensing cup C.

For the purpose of condensing the aroma of the coffee as it rises from the boiling liquid, I introduce a spirally coiled metallic tube F, having a bore of about one fourth of an inch in diameter. This spiral tube passes around near the walls of the condensing cup, and extending nearly to the top. The lower end of this spiral pipe F, passes through the bottom of the cup C, to which it is tightly soldered, the lower end opening into the body of the coffee pot.

The cylindrical part of the valve cover is nearly half an inch smaller in diameter than the body of the cup C. Consequently there is a space of about one fourth of an inch between the walls of the cup and cylindrical portion of the valve, which portion passes down outside the condensing tube to the line D, D; the condensing pipe F, consequently extends some distance above the bottom of the valve-cover E. When the condensing cup is filled nearly to the top of the spiral tube, upon introducing the valve cover, its weight will cause the water to sink in the interior of the cup by the pressure of the air confined within the valve. At the same time, the water thus displaced will rise upon the outside of the valve to D', or even to the top of the cup C. Consequently the valve is completely air tight and free from any friction except that caused by the water. A communication is thus established between the space in the body of the coffee pot above the coffee, and the air space in the upper portion of the condensing cup C.

In using this coffee pot, the ground coffee is put into the body of the pot, in the usual manner, and boiling water poured upon it. The condensing cup is then placed upon it, and filled nearly to the top of the spiral tube F with cold water, and the valve cover E introduced. Now, in boiling the coffee, the aroma will be condensed in passing along the spiral tube F, and will flow back into the body of the coffee pot.

Under ordinary circumstances, the water in the condensing cup, will not become sufficiently heated during one meal to allow the aroma to escape. In case it should become so, it can be easily changed and cold water again introduced.

Should the water become so heated as to give off steam, the valve cover will rise and thus allow the steam to escape, which act will give notice of the condition of the water in the condensing cup. The escape of steam will also prevent an explosion, which might otherwise occur, either from the condensing cup, or from steam from the body of the coffee pot, through the tube F.

When the water in the condenser becomes heated the valve cover is raised by the accumulation of steam, which is allowed to escape by the rising of the valve, and all danger of explosion is obviated.

What I claim as my improvement and desire to secure by Letters Patent, is—

The fluid-valve cover E, as arranged with the cup C, and the helical condensing tube F, all operating in the manner and for the purpose set forth.

JAMES B. PARISH.

Witnesses:
J. BRAINERD,
W. H. BURRIDGE.